(12) United States Patent
Tsumura et al.

(10) Patent No.: US 11,677,893 B2
(45) Date of Patent: Jun. 13, 2023

(54) LIGHTING DEVICE AND INSPECTION DEVICE WITH LIGHT IRRADIATION PORT CONFIGURED TO DISCHARGE COOLING AIR

(71) Applicant: KOMORI CORPORATION, Tokyo (JP)

(72) Inventors: Yusuke Tsumura, Ibaraki (JP); Takeshi Chiba, Ibaraki (JP); Osamu Yamamoto, Ibaraki (JP)

(73) Assignee: KOMORI CORPORATION, Tokyo (JP)

( * ) Notice: Subject to any disclaimer, the term of this patent is extended or adjusted under 35 U.S.C. 154(b) by 0 days.

(21) Appl. No.: 17/310,505

(22) PCT Filed: Feb. 7, 2020

(86) PCT No.: PCT/JP2020/004799
§ 371 (c)(1),
(2) Date: Aug. 6, 2021

(87) PCT Pub. No.: WO2020/162593
PCT Pub. Date: Aug. 13, 2020

(65) Prior Publication Data
US 2022/0038605 A1 Feb. 3, 2022

(30) Foreign Application Priority Data
Feb. 8, 2019 (JP) .............................. JP2019-021242

(51) Int. Cl.
*H04N 1/60* (2006.01)
*H04N 1/00* (2006.01)
*H04N 1/028* (2006.01)

(52) U.S. Cl.
CPC ....... *H04N 1/6044* (2013.01); *H04N 1/00023* (2013.01); *H04N 1/00034* (2013.01);
(Continued)

(58) Field of Classification Search
CPC .... H04N 1/00002–00092; H04N 1/603–6055; H04N 1/00724;
(Continued)

(56) References Cited

U.S. PATENT DOCUMENTS

| 3,947,106 A | 3/1976 | Hamaguchi et al. |
| 4,003,660 A | 1/1977 | Christie, Jr. et al. |

(Continued)

FOREIGN PATENT DOCUMENTS

| DE | 29606613 U1 | 6/1996 |
| DE | 19536770 A1 | 4/1997 |

(Continued)

OTHER PUBLICATIONS

Office Action received for Japanese Patent Application No. 2020-571288, dated May 10, 2022, 6 pages (3 pages of English Translation and 3 pages of Office Action).

(Continued)

*Primary Examiner* — Scott A Rogers
(74) *Attorney, Agent, or Firm* — Womble Bond Dickinson (US) LLP (57) ABSTRACT

A lighting device (23) irradiates a web under conveyance with light. The lighting device includes a light source (43), and an irradiation port (61) configured to open linearly in a widthwise direction of the web at an end portion facing the web. The irradiation port (61) is formed between first and second parallel portions (62b, 63b) where a first plate member (62) and a second plate member (63) parallelly face each other. The web under conveyance is irradiated with linear light. It is possible to provide a lighting device capable of irradiating only an inspection region of a sheet or a web with light.

5 Claims, 9 Drawing Sheets

(52) U.S. Cl.
CPC ..... *H04N 1/00045* (2013.01); *H04N 1/00063* (2013.01); *H04N 1/00068* (2013.01); *H04N 1/00981* (2013.01); *H04N 1/0289* (2013.01); *H04N 1/6097* (2013.01)

(58) Field of Classification Search
CPC ............. H04N 1/0281; H04N 1/02815; H04N 1/02885; H04N 1/02895; H04N 1/0289; H04N 1/407; H04N 1/4076; H04N 1/4078; H04N 1/409; H04N 1/58; H04N 1/6097; H04N 1/23–2392; G06T 7/0004; G06T 2207/30168
See application file for complete search history.

(56) References Cited

U.S. PATENT DOCUMENTS

| | | | | |
|---|---|---|---|---|
| 5,215,370 | A * | 6/1993 | Kaplan | H04N 1/02835 362/296.05 |
| 5,774,146 | A * | 6/1998 | Mizutani | B41J 2/21 347/15 |
| 5,791,249 | A | 8/1998 | Quadracci | |
| 6,275,600 | B1 * | 8/2001 | Banker | H04N 1/00058 358/406 |
| 6,803,937 | B2 * | 10/2004 | Hirooka | H04N 1/40037 347/246 |
| 7,903,287 | B2 * | 3/2011 | Itagaki | H04N 1/00087 358/1.9 |
| 8,474,942 | B2 * | 7/2013 | Kawai | B41J 2/2103 347/19 |
| 8,582,179 | B2 * | 11/2013 | Yamashita | H04N 1/6033 358/1.9 |
| 8,740,343 | B2 * | 6/2014 | Kawai | H04N 1/6033 347/19 |
| 10,659,640 | B2 * | 5/2020 | Wei | G03G 15/2039 |
| 11,303,781 | B2 * | 4/2022 | Kashiwagi | H04N 1/6008 |
| 11,356,581 | B2 * | 6/2022 | Kasahara | H04N 1/6033 |
| 2002/0071688 | A1 * | 6/2002 | Maruyama | H04N 1/00734 399/68 |
| 2004/0160650 | A1 * | 8/2004 | Ide | H04N 1/0287 358/509 |
| 2004/0212816 | A1 * | 10/2004 | Tanabe | H04N 1/6033 283/117 |
| 2009/0293745 | A1 | 12/2009 | Abe | |
| 2010/0046233 | A1 | 2/2010 | Chou et al. | |
| 2012/0162669 | A1 * | 6/2012 | Miyazaki | H04N 1/00424 358/1.2 |
| 2013/0039030 | A1 | 2/2013 | Kunimatsu et al. | |
| 2015/0049921 | A1 * | 2/2015 | Crean | G06T 7/0004 382/112 |
| 2018/0278807 | A1 * | 9/2018 | Miwa | G01J 3/524 |
| 2021/0409574 | A1 * | 12/2021 | Oba | H04N 1/00708 |
| 2022/0053104 | A1 * | 2/2022 | Kikuchi | H04N 1/0009 |
| 2022/0141355 | A1 * | 5/2022 | Tsujita | H04N 1/6036 358/1.9 |

FOREIGN PATENT DOCUMENTS

| | | | |
|---|---|---|---|
| GB | 2471376 | A | 12/2010 |
| JP | 50-068583 | U | 6/1975 |
| JP | 59-128418 | A | 7/1984 |
| JP | 05040022 | A * | 2/1993 |
| JP | 06-090328 | A | 3/1994 |
| JP | 10-322521 | A | 12/1998 |
| JP | 2000283852 | A * | 10/2000 |
| JP | 2008-198478 | A | 8/2008 |
| JP | 2009-125977 | A | 6/2009 |
| JP | 2009-285909 | A | 12/2009 |
| JP | 2009-286538 | A | 12/2009 |
| JP | 2011-005726 | A | 1/2011 |
| JP | 2012-069395 | A | 4/2012 |
| JP | 2012-216418 | A | 11/2012 |
| JP | 2013-037158 | A | 2/2013 |
| JP | 2013-075519 | A | 4/2013 |
| JP | 2014-120409 | A | 6/2014 |
| JP | 2014-178295 | A | 9/2014 |
| JP | 2016-198899 | A | 12/2016 |
| JP | 2017-177495 | A | 10/2017 |
| JP | 2017-207427 | A | 11/2017 |
| WO | 2012/133780 | A1 | 10/2012 |
| WO | 2015/140756 | A1 | 9/2015 |
| WO | 2015/159941 | A1 | 10/2015 |
| WO | WO-2020067158 | A1 * | 4/2020 |

OTHER PUBLICATIONS

International Preliminary Report on Patentability received for PCT Patent Application No. PCT/JP2020/004799, dated Aug. 19, 2021, 13 pages (8 pages of English Translation and 5 pages of Original Document).

International Search Report and Written Opinion received for PCT Patent Application No. PCT/JP2020/004799, dated Apr. 7, 2020, 17 pages (9 pages of English Translation and 8 pages of Original Document).

Notice of Reasons for Refusal received for Japanese Patent Application No. 2020-571288, dated Jul. 19, 2022, 10 pages (5 pages of English Translation and 5 pages of Office Action).

Office Action received for Japanese Patent Application No. 2020-571288, dated Oct. 4, 2022, 6 pages (4 pages of English Translation and 2 pages of Office Action).

Supplementary European Search Report and Search Opinion received for EP Patent Application No. 20753103.9, dated Oct. 6, 2022, 10 pages.

* cited by examiner

LIGHTING DEVICE AND INSPECTION DEVICE WITH LIGHT IRRADIATION PORT CONFIGURED TO DISCHARGE COOLING AIR

TECHNICAL FIELD

The present invention relates to a lighting device configured to irradiate a pattern printed on a sheet or a web with light, and an inspection device including the lighting device.

BACKGROUND ART

Some conventional printing presses include an inspection device configured to measure the density of a color after printing using a device called an inline density measuring device and determine quality of printing using the density. A conventional inline density measuring device is described in, for example, patent literature 1.

In the inline density measuring device disclosed in patent literature 1, a color bar on a sheet-like object conveyed after printing is captured by a camera, and the color measurement value (RGB value) of obtained image data is converted into a converted density value by calculation. If the difference between the converted density value and a predetermined reference density value serving as a determination criterion falls within an allowable range, the inspection device determines that the quality is high.

To convert the color measurement value into the converted density value, a conversion formula is used. The conversion formula is created using the reference density value obtained by reading the color bar using a dedicated mobile densitometer and the color measurement value (to be referred to as a reference color measurement value hereinafter) of the image data obtained by capturing the color bar by the camera. The conversion formula is an equation for calculating the reference density value from the reference color measurement value.

The image data obtained by image capturing using the camera is influenced by a pattern on the periphery of the color bar. For this reason, if the printed pattern changes, the color measurement value of the image data captured by the camera is different from the reference color measurement value even if the color bar is printed in the reference density value. Hence, in this case, the color measurement value of the color bar cannot correctly be measured and, accordingly, the converted density value to be obtained using the conversion formula cannot correctly be obtained. Hence, if the job of the printing press is switched, and the pattern of the printed product changes, the conversion formula needs to be created again using a reference density value obtained by reading the color bar using the dedicated mobile densitometer and a reference color measurement value of image data obtained by capturing the color bar by the camera.

RELATED ART LITERATURE

Patent Literature

Patent Literature 1: Japanese Patent Laid-Open No. 2013-75519

DISCLOSURE OF INVENTION

Problem to be Solved by the Invention

In the above-described conventional inline density measuring device, since the image data obtained by image capturing using the camera is influenced by the pattern on the periphery of the color bar, the conversion formula needs to be re-created every time the print job is switched. Hence, the efficiency when switching the print job becomes low.

It is an object of the present invention to provide a lighting device capable of irradiating only an inspection region on a sheet or a web with light. It is another object of the present invention to raise efficiency when switching a print job.

Means of Solution to the Problem

In order to achieve the above object of the present invention, there is provided a lighting device configured to irradiate one of a sheet and a web under conveyance with light, comprising a light source, and an irradiation port which opens linearly in a widthwise direction of one of the sheet and the web at an end portion facing one of the sheet and the web, wherein the irradiation port is formed between parallel portions where a first plate member and a second plate member parallelly face each other, and one of the sheet and the web under conveyance is irradiated with linear light.

According to the present invention, there is provided an inspection device comprising a lighting device according to the present invention, an imaging unit configured to capture a color bar printed on one of a sheet and a web in a state in which the color bar is irradiated with light of the lighting device during conveyance of one of the sheet and the web, a type detection unit configured to detect a type of one of the sheet and the web, an acquisition unit configured to acquire a color measurement value of image data captured by the imaging unit, a storage unit configured to store a correction value for each type of one of the sheet and the web, a calculation unit configured to read out, from the storage unit, the correction value corresponding to the type of one of the sheet and the web detected by the type detection unit and obtain a density value of the color bar by calculation using the correction value and the color measurement value acquired by the acquisition unit, and a determination unit configured to determine quality by comparing the density value with a determination criterion value.

Effect of the Invention

In the present invention, it is possible to irradiate only an inspection region on a sheet or a web with light of a lighting device. For this reason, when capturing a color bar, the color bar can be captured by an image capturing device without any influence of a pattern on the periphery of the color bar, and image data of the color bar in original colors can be obtained by image capturing. Hence, since the conversion formula need not be re-created when switching the print job, it is possible to provide a lighting device capable of raising efficiency when switching the print job.

BEST MODE FOR CARRYING OUT THE INVENTION

First Embodiment

A lighting device and an inspection device according to the present invention will now be described in detail with reference to FIGS. 1 to 8. In this embodiment, an example in which the present invention is applied to a web offset printing press is shown.

Figure 1:
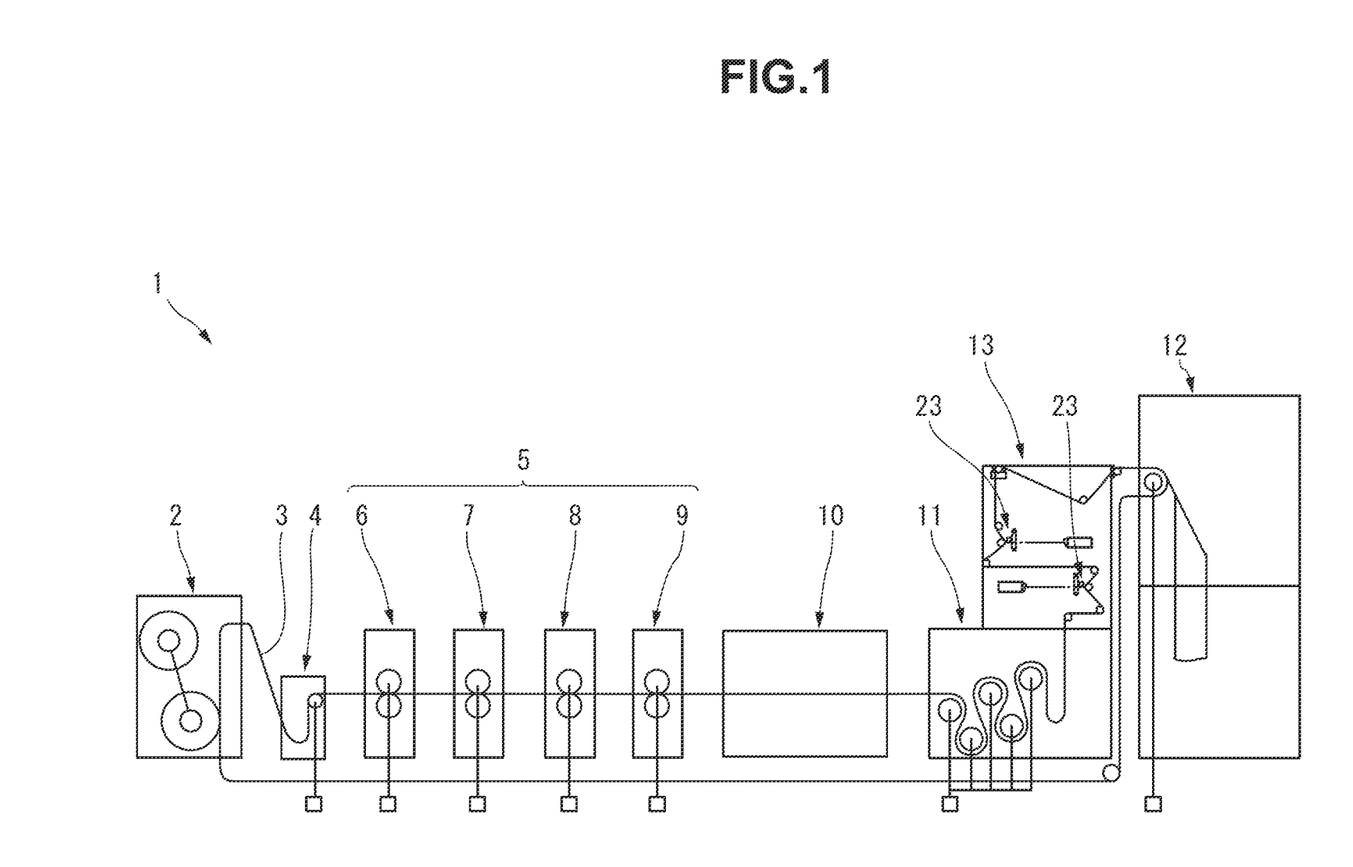
FIG. 1 is a side view of a web offset printing press including a lighting device and an inspection device according to the present invention.

A web offset printing press 1 shown in FIG. 1 includes a web supply unit 2 on the leftmost side in FIG. 1, and sends a web 3 from the web supply unit 2 to the right side in FIG. 1. An infield unit 4 is provided on the right side of the web supply unit 2, and a printing section 5 is provided on the right side of the infield unit 4. The printing section 5 performs printing on both the obverse and reverse surfaces of the web 3 by first to fourth printing units 6 to 9. On the downstream side of the printing section 5 along the conveyance direction of the web 3, a drying unit 10, a cooling unit 11, and a folding machine 12 are arranged in this order. A web path unit 13 is provided on the upper side of the cooling unit 11. The web 3 is sent from the web path unit 13 to the folding machine 12.

Figure 2:
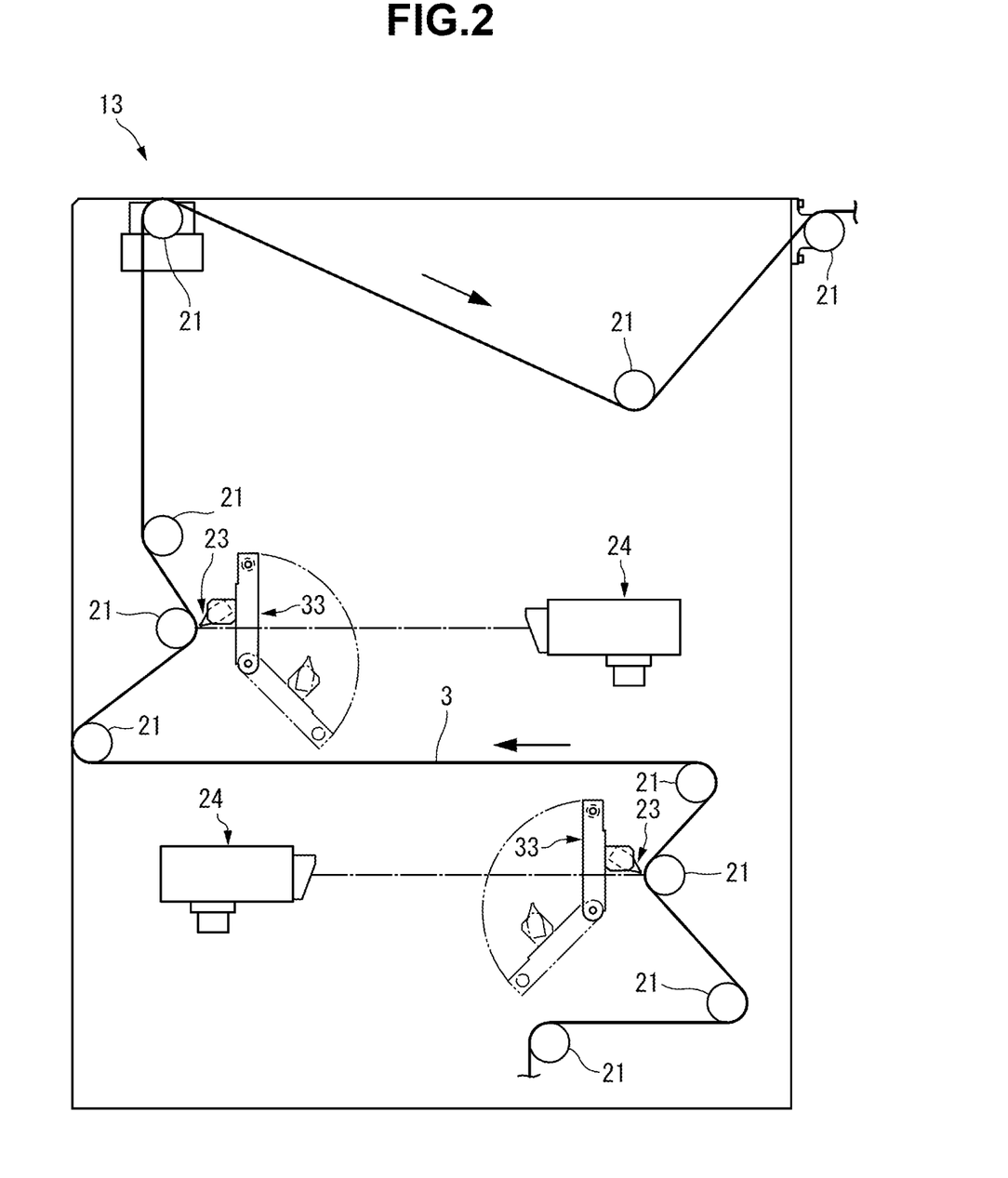
FIG. 2 is an enlarged side view of a part of the printing press.

As shown in FIG. 2, the web path unit 13 employs a structure configured to send the web 3 wound around a plurality of rollers 21 to the upper side. In the lower portion of the web path unit 13, two lighting devices 23 and two cameras 24, which form a part of an inspection device 22 (see FIG. 8) according to the present invention, are provided. The lighting devices 23 and the cameras 24 are arranged at two points apart in the vertical direction in the web path unit 13. The lighting device 23 on the lower side irradiates the obverse surface of the web 3 advancing upward in the web path unit 13 with light obliquely from above. The lighting device 23 on the upper side irradiates the reverse surface of the web 3 advancing upward in the web path unit 13 with light obliquely from above.

The camera 24 on the lower side captures, from the horizontal direction, the web 3 irradiated with light by the lighting device 23 on the lower side, and sends image data to a control device 25 (see FIG. 8) to be described later. The configuration of the control device 25 will be described later. The camera 24 on the upper side captures, from the horizontal direction, the web 3 irradiated with light by the lighting device 23 on the upper side, and sends image data to the control device 25. Each of the cameras 24 is formed by a line camera and can simultaneously capture the web 3 from one end to the other end in the widthwise direction.

Figure 3:
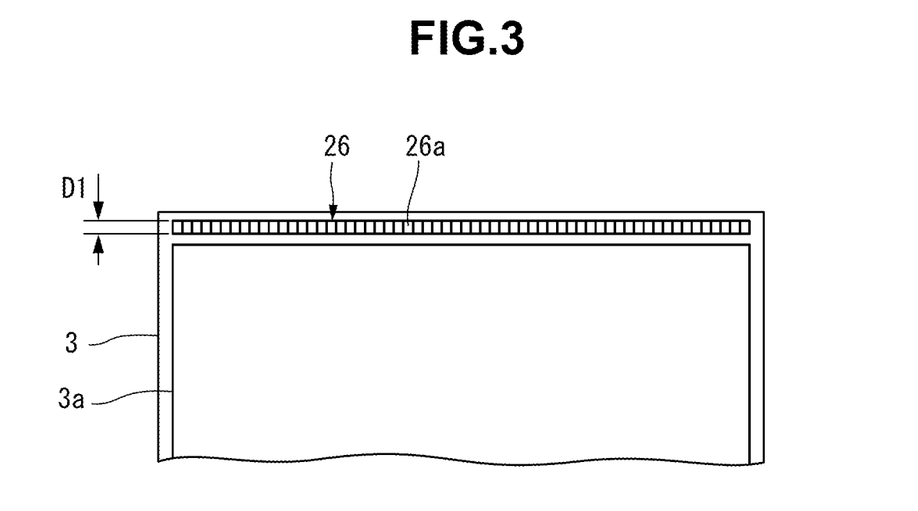
FIG. 3 is a plan view showing a color bar.

The camera 24 according to this embodiment captures a color bar 26 provided in a margin portion near a printed portion 3a of the web 3, as shown in FIG. 3. FIG. 3 shows an end portion of the web 3 that has been cut off. The color bar 26 extends in a predetermined width D1 from one end portion to the other end portion of the web 3 in the widthwise direction (the left-and-right direction in FIG. 3), and is formed by a number of color patches 26a arranged in the widthwise direction. Each color patch 26a is printed such that a predetermined density of, for example, 100% can be obtained as a color density by the first to fourth printing units 6 to 9.

Figure 4:
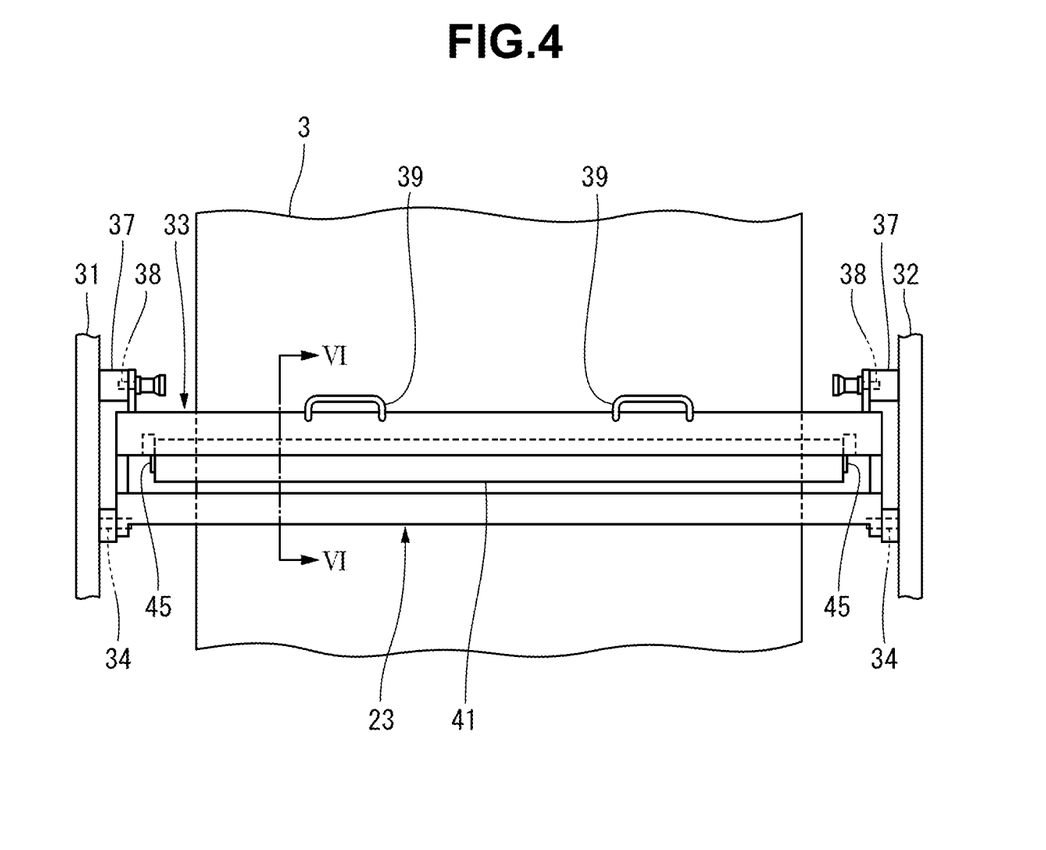
FIG. 4 is a rear view showing the lighting device viewed from a camera side.
Figure 5:
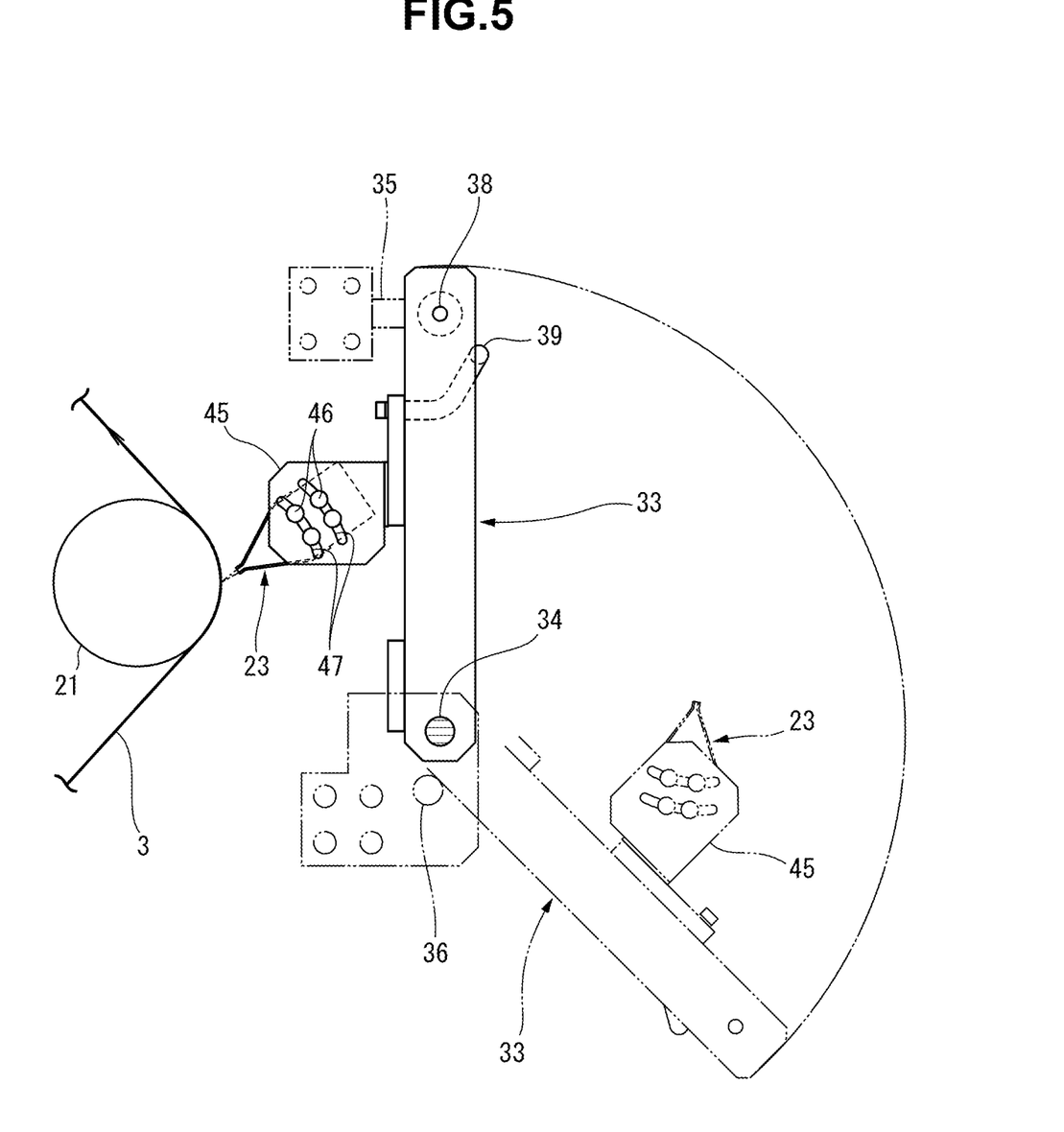
FIG. 5 is a side view of the lighting device.

As shown in FIG. 4, the lighting device 23 is formed into an elongated shape extending from one end side to the other end side of the web 3 in the widthwise direction (the left-and-right direction in FIG. 4) when viewed from the camera side, and its two end portions in the longitudinal direction are attached to a pair of frames 31 and 32 of the printing press 1 via a support frame 33. The support frame 33 is stretched between the pair of frames 31 and 32 of the printing press 1 and swingably supported by the frames 31 and 32 via support shafts 34. The support shafts 34 are connected to the lower end portion of the support frame 33. Hence, as shown in FIG. 5, the support frame 33 can swing between a use position indicated by a solid line in FIG. 5 and a retreat position indicated by an alternate long and two short dashed line in FIG. 5.

Each of the frames 31 and 32 is provided with an upper stopper 35 and a lower stopper 36 to define the position of the support frame 33. The upper stopper 35 regulates falling of the support frame from the use position to the side of the web 3. Lock pins 38 that detachably engage with engaging members 37 (see FIG. 4) of the frames 31 and 32 are provided at the upper end portion of the support frame 33 at the use position. When the lock pins 38 are inserted into and engage with the engaging members 37, the support frame 33 is held at the use position. When the lock pins 38 are removed from the engaging members 37 and disengaged, the support frame 33 can swing from the use position to the retreat position. The support frame 33 according to this embodiment includes handles 39 to be held by both hands of an operator (not shown) at the time of swing.

The lower stopper 36 supports, from the lower side, the support frame 33 that has swung to the retreat position, and regulates downward swing of the support frame 33 from the retreat position.

Figure 6:
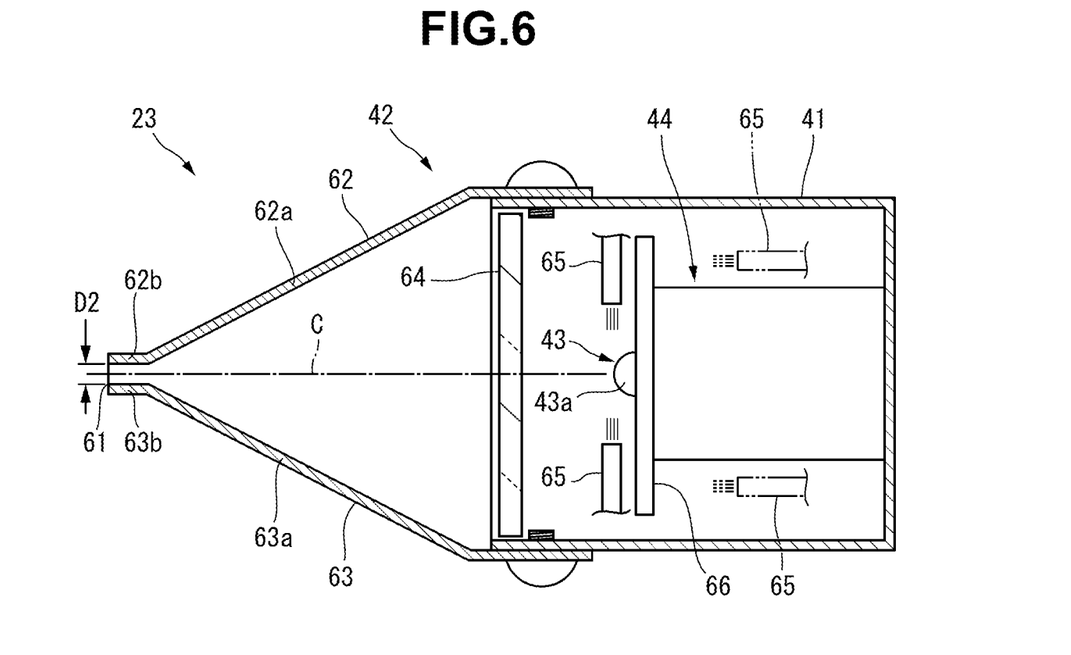
FIG. 6 is a sectional view of the lighting device taken along a line VI-VI in FIG. 4.

As shown in FIG. 6, the lighting device 23 is equipped with a box-shaped housing 41 with an opening on one of its sides, a light shielding member 42 attached to the opening of the housing 41, a light emitting device 44 including a light source 43 and stored in the housing 41, and the like.

As shown in FIG. 4, the housing 41 is formed long in the widthwise direction of the web 3. In the longitudinal direction of the web 3, the length of the housing 41 is longer than the width of the web 3. The two end portions of the housing 41 in the longitudinal direction are attached to the support frame 33 via brackets 45 (see FIG. 5). The housing 41 is attached to the bracket 45 by threadably engaging a plurality of attachment bolts 46 extending through the bracket 45 with the housing 41, as shown in FIG. 5. In this embodiment, arc-shaped long holes 47 configured to pass the attachment bolts 46 are formed in the bracket 45 such that the attachment angle of the housing 41 can be changed.

As shown in FIG. 6, the light shielding member 42 includes, at its end portion facing the web 3, an irradiation port 61 that opens linearly in the widthwise direction of the web 3. The light shielding member 42 according to this embodiment includes a first plate member 62 attached to the upper portion of the housing 41 in FIG. 6, and a second plate member 63 attached to the lower portion of the housing 41 in FIG. 6.

The pair of first and second plate members 62 and 63 are formed by bending plates made of a metal such that these are parallel to each other. In addition, the first and second plate members 62 and 63 are formed with the same length as the housing 41 in the widthwise direction of the web 3.

Also, the first and second plate members 62 and 63 include first and second reflecting portions 62a and 63a that are inclined such that the space between the plate members 62 and 63 gradually becomes narrower from the side of the light source 43 toward the irradiation port 61, and first and second parallel portions 62b and 63b extending from the distal ends of the first and second reflecting portions 62a and 63a in parallel to an optical axis C of the light emitting device 44.

The irradiation port 61 is formed between the first parallel portion 62b and the second parallel portion 63b, where the first plate member 62 and the second plate member 63 parallelly face each other.

The space between the first parallel portion 62b and the second parallel portion 63b, that is, an opening width D2 of the irradiation port 61 in a direction orthogonal to the widthwise direction of the web 3 is narrower than the width D1 (see FIG. 3) of the color bar 26 in the direction orthogonal to the widthwise direction of the web 3. Hence, linear light narrower than the width D1 of the color bar 26 exits from the irradiation port 61.

The light emitting device 44 includes the light source 43, a lens 64 located on a side of the opening of the housing 41, and air blast members 65 located near the light source 43.

The light source 43 is formed by a number of LEDs 43a. The LEDs 43a are mounted on a substrate 66 such that the optical axis C is perpendicular to the substrate 66, and are provided while being arranged at a predetermined interval in the whole region in the longitudinal direction of the housing 41.

The lens 64 is configured to diffuse light from the light source 43 to the whole region in the light shielding member 42. Some of the light diffused by the lens 64 directly travels toward the irradiation port 61, and most of the remaining light is reflected by the first and second reflecting portions 62a and 63a and sent to the irradiation port 61. For this reason, from the irradiation port 61, the light exits in a direction parallel or almost parallel to the optical axis C, and the web 3 is irradiated with linear light having a narrow width in the direction orthogonal to the widthwise direction.

The air blast members 65 blast air sent from an air supply source (not shown). The air blast members 65 are arranged on both sides of the LEDs 43a and supported by the housing 41 such that the air is blasted to the LEDs 43a. When the air is blasted to the LEDs 43a, the LEDs 43a are cooled. Note that the air blast members 65 may be arranged to blast air to the back surface of the substrate 66, as indicated by long and two short dashed lines in FIG. 6.

Since the air blasted from the air blast members 65 passes inside the light shielding member 42 and is discharged from the irradiation port 61 to the outside of the lighting device 23, the air is blasted from the irradiation port 61. The air always flows near the irradiation port 61. This prevents powder dust generated from the web 3 or ink mist generated in the first to fourth printing units 6 to 9 from entering the light shielding member 42 via the irradiation port 61, and adhering to the lens 64 or the light source 43 or adhering to the distal end portion of the irradiation port 61 and closing the irradiation port 61.

Figure 7:
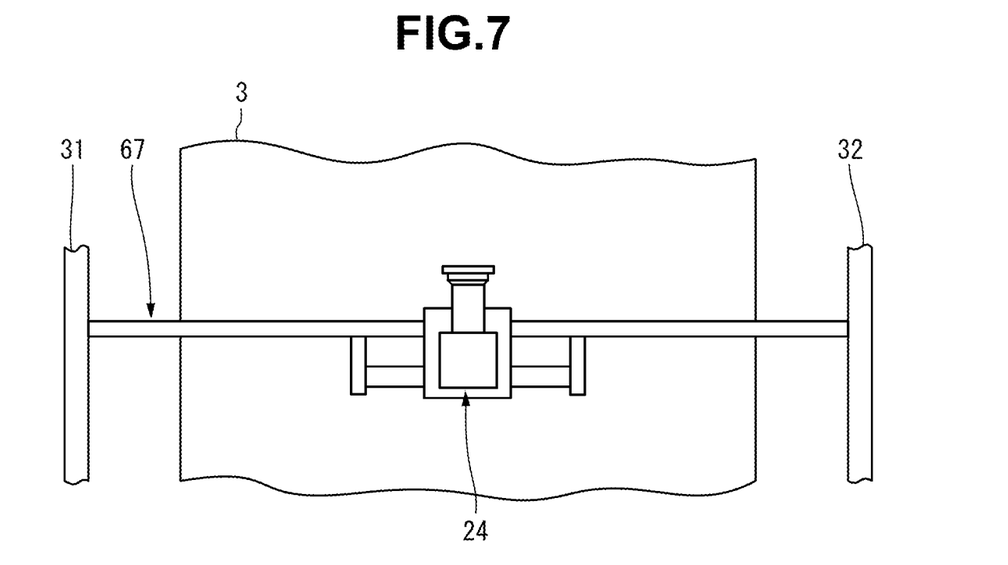
FIG. 7 is a plan view of a camera.

As shown in FIG. 7, the camera 24 is attached to a support member 67 stretched between the pair of frames 31 and 32 of the printing press 1, and arranged at a position corresponding to the center portion of the web 3 in the widthwise direction.

Figure 8:
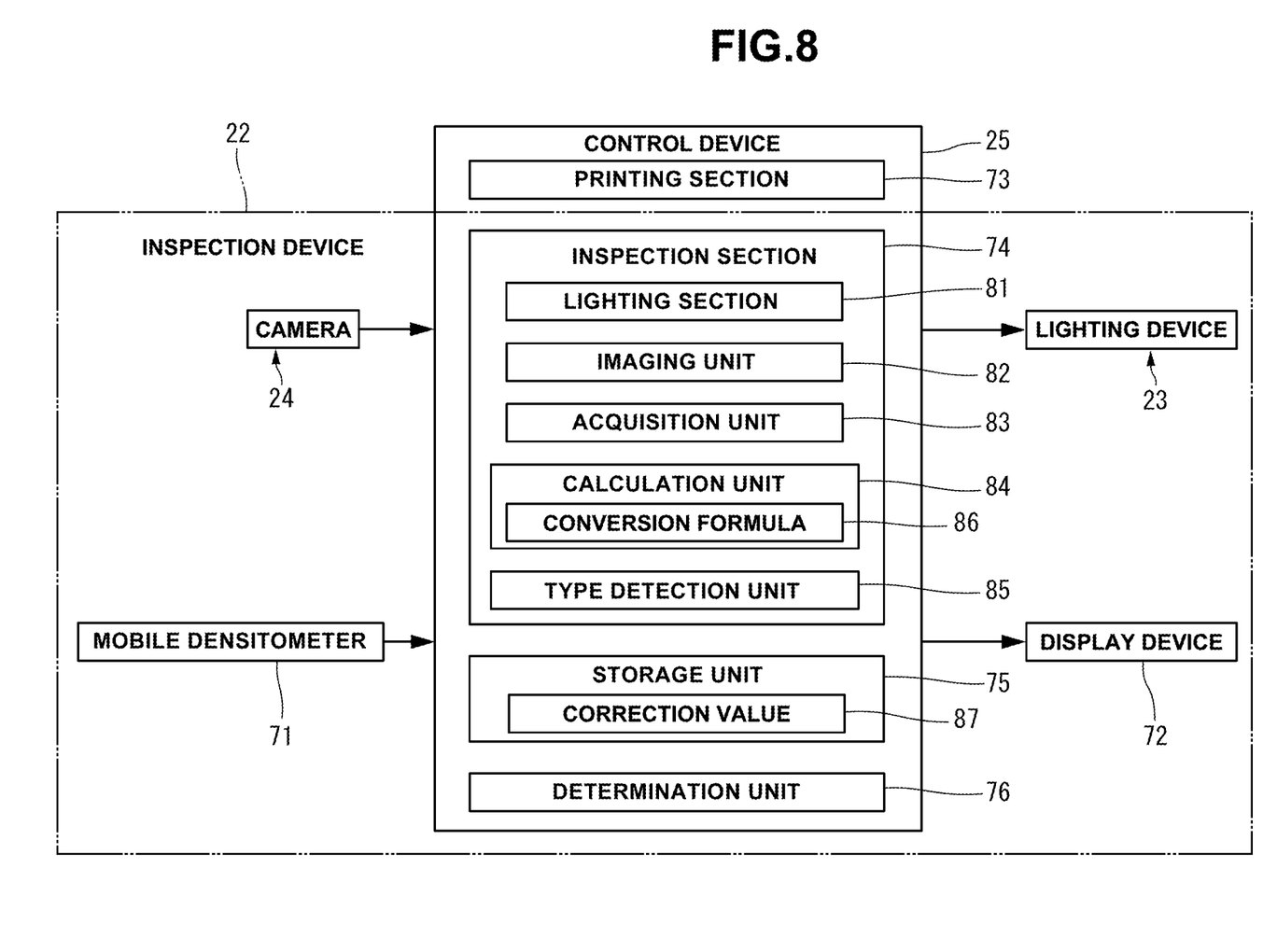
FIG. 8 is a block diagram showing the configuration of the inspection device.

As shown in FIG. 8, the inspection device 22 includes a part of the control device 25 configured to control the operation of the printing press 1, the above-described lighting device 23 and the camera 24, a mobile densitometer 71 to be described later, a display device 72, and the like. The mobile densitometer 71 reads the color bar 26 serving as the reference of the web 3 cut for each printed portion 3a (see FIG. 3) by a dedicated image reader (not shown), and measures the density of each color patch 26a from image data obtained by the image reader. The measurement result is sent as a reference density value to the control device 25. The display device 72 displays the operation state of the printing press 1, various kinds of alarms, and the like.

The control device 25 includes a printing section 73, an inspection section 74, a storage unit 75, and a determination unit 76. The printing section 73 controls the operations of the drive motor (not shown) and various kinds of actuators of the printing press 1.

The inspection section 74 includes a lighting section 81, an imaging unit 82, an acquisition unit 83, a calculation unit 84, and a type detection unit 85.

The lighting section 81 switches ON/OFF of the light source 43. The imaging unit 82 includes the camera 24, a circuit (not shown) configured to control the image capturing operation of the camera 24, and the like, and captures the color bar 26 by the camera 24 during conveyance of the web 3.

The acquisition unit 83 acquires the color measurement value (RGB value) of the image data captured by the camera 24. The image data is image data of each color patch 26a of the color bar 26.

The calculation unit 84 performs calculation using a conversion formula 86 prepared in advance and a correction value 87 stored in the storage unit 75. The conversion formula 86 is an equation for calculating the reference density value measured by the mobile densitometer 71 from a reference color measurement value obtained by capturing, by the camera 24, the color bar 26 similar to the reference color bar 26 measured by the mobile densitometer 71. As the conversion formula 86, an equation similar to an equation described in, for example, Japanese Patent Laid-Open No. 2013-75519 of prior application by the applicant of the present invention can be used. When the conversion formula 86 is used, a density value can be converted from the color measurement value obtained by capturing the color bar 26 that is not a reference. The density value obtained by the calculation will be referred to as a "converted density value" hereinafter.

The correction value 87 is determined for each type of the web 3. If the type of the web 3 changes, even if printing is performed in the same density, the density value changes from the converted density value based on the color measurement value obtained by image capturing by the camera 24. The correction value 87 is a value used to correct a calculation result that changes due to the type of the web 3. That is, when the calculation unit 84 performs calculation using the color measurement value of actual image data obtained by image capturing using the camera 24 and the above-described conversion formula 86 and the correction value 87, a corrected converted density value corrected by the correction value 87 is obtained.

The data of the type of the web 3 is included in basic data to be used by the printing section 73 to control a printing operation. The type detection unit 85 reads out the data of the type of the web 3 from the basic data.

The storage unit 75 stores the above-described correction value 87 for each type of the web 3 as a correction processing table.

The determination unit 76 compares the corrected converted density value with a predetermined reference density value (determination criterion value) serving as a predetermined determination criterion for each color patch 26a. If the difference between the values falls within an allowable range, it is determined that the quality is high. If the difference falls outside the allowable range, it is determined that the quality is poor. The determination unit 76 displays the quality determination result on the display device 72.

In the printing press 1 including the thus configured inspection device 22, when printing is performed on the web 3, the color bar 26 is captured by the camera 24 in the web path unit 13, and the determination unit 76 determines the quality of the ink density based on image data obtained by the image capturing.

The quality determination is performed by the determination unit 76 by comparing the corrected converted density value obtained by the calculation unit 84 using the color measurement value of the actual image data obtained by image capturing using the camera 24, the conversion formula 86, and the correction value 87 corresponding to the type of the current web 3 with the reference density value serving as the determination criterion.

The color measurement value of the actual image data obtained by image capturing using the camera 24 does not change even if the pattern printed on the web 3 changes, if the ink supply amounts in the first to fourth printing units 6 to 9 do not change. This is because the lighting device 23 irradiates the color bar 26 on the web 3 with linear light, and only the color bar 26 can be irradiated with the light of the lighting device 23. For this reason, the color bar 26 can be captured by the camera 24 without any influence of the pattern on the periphery of the color bar 26, and the image data of the color bar 26 in original colors can be obtained by the image capturing.

That the color measurement value of the image data captured using the camera 24 does not change even if the pattern changes means that it is unnecessary to perform conversion formula re-obtainment that is performed in the conventional device. Hence, according to this embodiment, since the conversion formula re-obtainment need not be performed at the time of print job switching, it is possible to provide a lighting device capable of raising efficiency when switching the print job.

The irradiation port 61 according to this embodiment is formed between the first parallel portion 62b and the second parallel portion 63b, where the first plate member 62 and the second plate member 63 parallelly face each other. For this reason, since light that is not parallel or almost parallel to the optical axis C is shielded by the first plate member 62 and the second plate member 63, the color bar 26 is substantially irradiated with parallel light.

As a result, only the color bar portion is irradiated with the light of the lighting device 23, and image data is never influenced by diffused light from the pattern on the periphery of the color bar 26. Hence, accurate density measurement can be performed, and the frequency of re-obtaining the conversion formula can be reduced. It is therefore possible to prevent the web 3 from being wasted and save the work time needed for preparation until actual printing.

The lighting device 23 according to this embodiment includes the air blast members 65. It is therefore possible to prevent dirt such as ink mist or powder dust from adhering to the lens 64, the light source 43, or the irradiation port 61 and reduce the maintenance frequency, and it is also possible to maintain high inspection performance and density measurement performance.

Also, since the lighting device 23 includes the air blast members 65, it is possible to suppress a brightness change by cooling the light source 43 (LEDs 43a) with cooling air.

The first plate member 62 and the second plate member 63 according to this embodiment include the first and second reflecting portions 62a and 63a that are inclined such that the space between the plate members 62 and 63 gradually becomes narrower from the side of the light source 43 toward the irradiation port 61.

For this reason, since the color bar 26 can be irradiated with strong (bright) light from the irradiation port 61, the brightness difference between the color bar 26 and the pattern on the periphery becomes large, and the image data is more hardly influenced by the pattern on the periphery in image capturing. Hence, a density value close to the reference density value measured by the mobile densitometer 71 can be obtained using the camera 24, and the reliability of the determination result by the determination unit 76 becomes higher.

The opening width D2 of the irradiation port 61 according to this embodiment in the direction orthogonal to the widthwise direction of the web 3 is narrower than the width D1 of the color bar 26 in the direction orthogonal to the widthwise direction of the web 3. According to the lighting device 23, only the color bar 26 is irradiated, and a stable slit light source is generated. Hence, the accuracy of density quality determination becomes higher.

In the inspection device 22 according to this embodiment, if the print job changes, and the type of the web 3 changes, the type detection unit 85 detects the type of the new web 3. Then, the calculation unit 84 obtains a corrected converted density value corresponding to the new web 3 using the correction value 87 according to the type of the web 3, a color measurement value obtained by capturing, using the camera 24, the color bar 26 printed on the new web 3, and the conversion formula 86.

Hence, according to this embodiment, density measurement can be performed without correction processing not only in a case in which the printing material (web 3) does not change, and only the pattern changes but also in a case in which the printing material changes.

Second Embodiment

Figure 9:
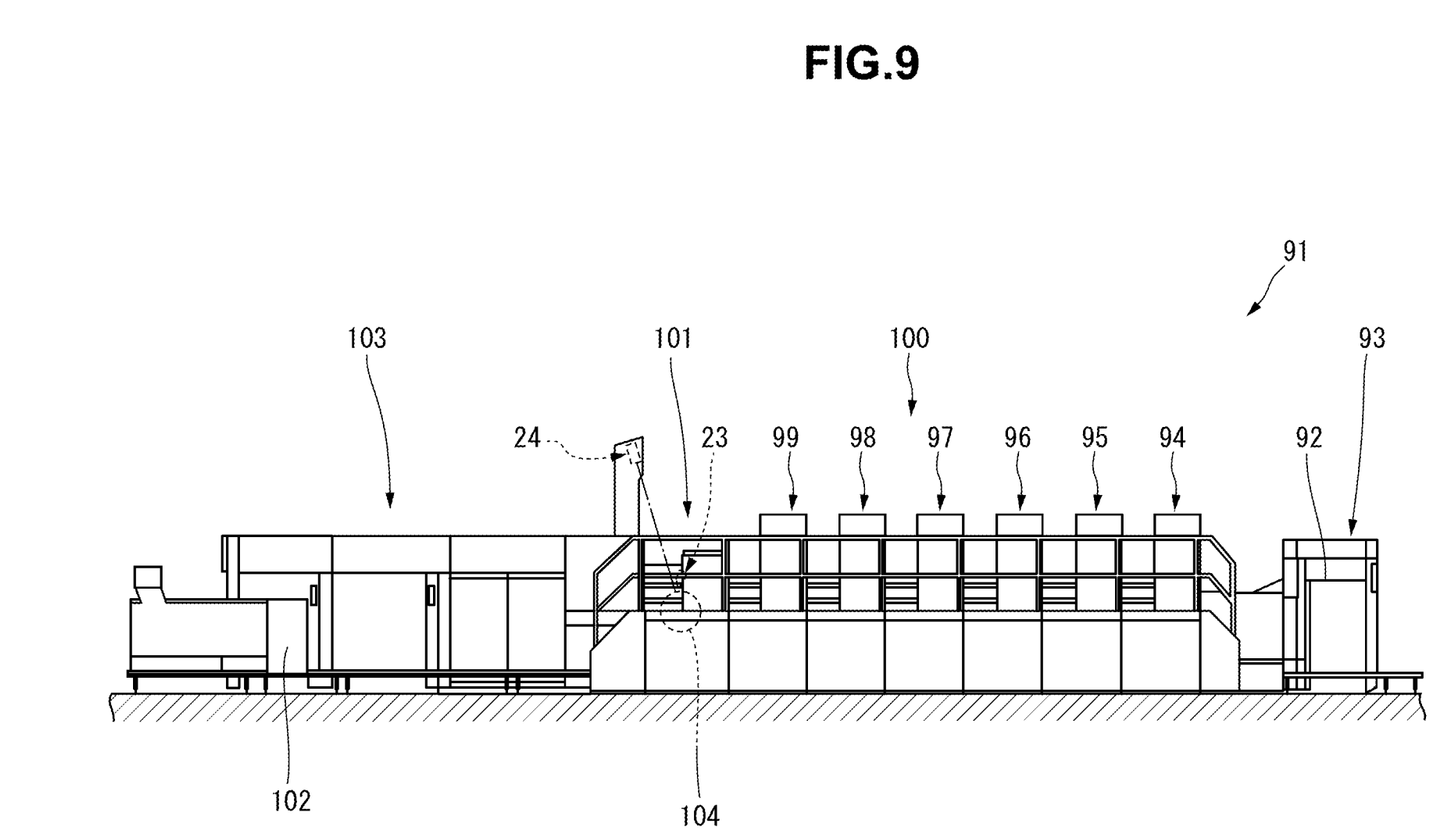
FIG. 9 is a side view of a sheet-fed offset printing press according to another embodiment.
Figure 10:
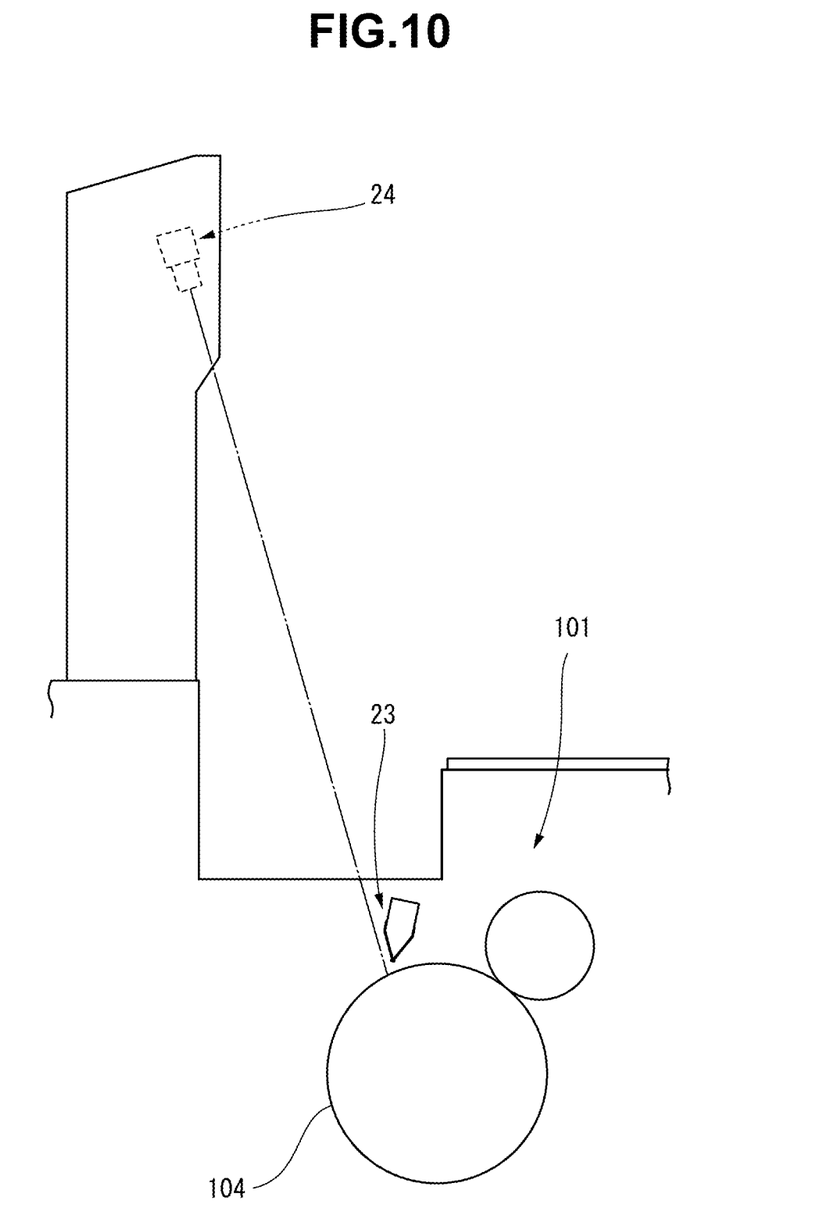
FIG. 10 is an enlarged side view showing the main part of the sheet-fed offset printing press.

A lighting device can be configured as shown in FIGS. 9 and 10. The same reference numerals as in FIGS. 1 to 8 denote the same or similar members in FIGS. 9 and 10, and a detailed description thereof will appropriately be omitted.

A printing press 91 shown in FIG. 9 is a sheet-fed offset printing press, and a sheet supply unit 93 configured to supply a sheet 92 is provided at an end portion on the right side in FIG. 9. The printing press 91 includes a printing section 100 including first to sixth printing units 94 to 99, a coating unit 101 located on the downstream side of the printing section 100 along the conveyance direction of the sheet 92, and a sheet discharge unit 103 configured to dry the sheet 92 coated by the coating unit 101 and discharge it to a discharge pile 102. The first to sixth printing units 94 to 99 perform printing on one surface of the sheet 92.

In this embodiment, a lighting device 23 according to the present invention is arranged at a position facing an impression cylinder 104 in the coating unit 101. As shown in FIG. 10, the lighting device 23 according to this embodiment is arranged immediately above the impression cylinder 104, and irradiates the upper surface (printed surface) of the sheet 92 conveyed by the impression cylinder 104 with linear light. A camera 24 is provided at a position apart upward from the impression cylinder 104.

In this embodiment, a color bar 26 on the sheet 92 can be captured by the camera 24 without any influence of a pattern on the periphery. Hence, according to this embodiment, efficiency when switching the print job of the sheet-fed offset printing press 91 becomes higher.

Third Embodiment

Figure 11:
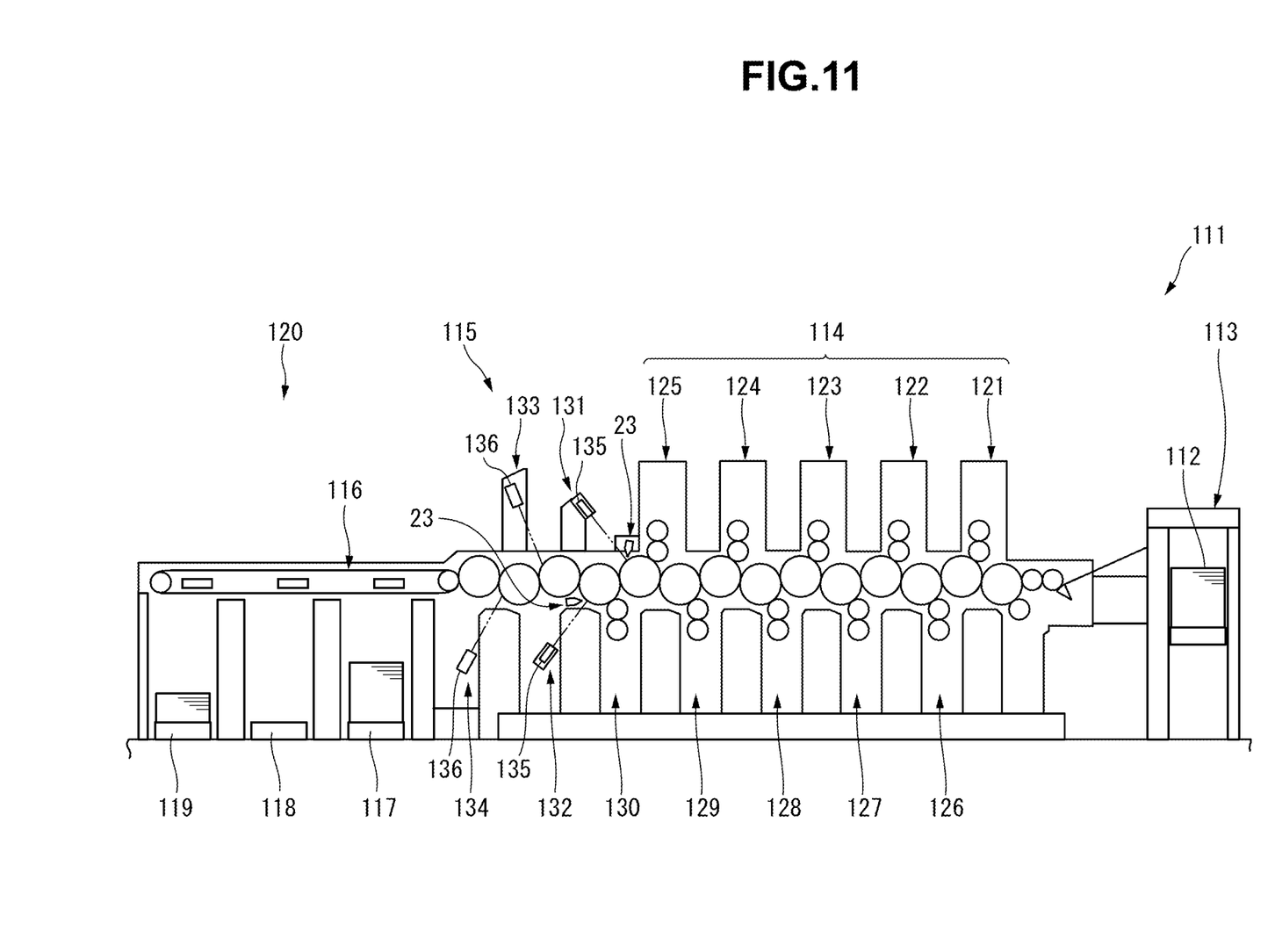
FIG. 11 is a side view of a sheet-fed offset printing press according to still another embodiment.

A lighting device can be configured as shown in FIG. 11. The same reference numerals as in FIGS. 1 to 8 denote the same or similar members in FIG. 11, and a detailed description thereof will appropriately be omitted.

A printing press 111 shown in FIG. 11 is a sheet-fed offset printing press, and a sheet supply unit 113 configured to supply a sheet 112 is provided at an end portion on the right side in FIG. 11. The printing press 111 includes a printing section 114 configured to perform double-sided printing, an inspection section 115 provided on the downstream side of the printing section 114 along the conveyance direction of the sheet 112, and a sheet discharge unit 120 configured to send the sheet 112 inspected by the inspection section 115 by a chain-type conveyance device 116 and discharge it to a plurality of delivery piles 117 to 119.

The printing section 114 includes first to fifth surface printing units 121 to 125 configured to perform printing on the obverse surface of the sheet 112, and first to fifth back printing units 126 to 130 configured to perform printing on the reverse surface of the sheet 112.

The inspection section 115 includes an upstream-side surface inspection unit 131 and an upstream-side back inspection unit 132, and a downstream-side surface inspection unit 133 and a downstream-side back inspection unit 134.

The upstream-side surface inspection unit 131 and the upstream-side back inspection unit 132 perform inspection of the printing quality of the sheet 112 and density inspection of a color bar 26 using visible light cameras 135. In this embodiment, a lighting device 23 according to the present invention irradiates the sheet 112 to be captured by the visible light camera 135 with linear light. The visible light camera 135 is the same as the camera 24 used when employing the first embodiment.

The downstream-side surface inspection unit 133 and the downstream-side back inspection unit 134 perform inspection of the printing quality of the sheet 112 using ultraviolet cameras 136.

According to this embodiment, it is possible to perform ink density inspection on both the obverse surface and the reverse surface of the sheet 112. In addition, since the color bar 26 can be captured by the visible light camera 135 without any influence of a pattern on the periphery of the color bar 26, efficiency when switching the print job of the sheet-fed offset printing press 111 becomes higher.

In the above-described embodiments, an example in which the lighting device according to the present invention is used in a density inspection device configured to capture a color bar and inspect the density of ink has been described. However, the lighting device according to the present invention is not limited to this example, and may be used in a pattern inspection device configured to inspect the presence/absence of a printing failure such as printing omission or dirt adhesion in a printed pattern portion. Even in this case, a linear narrow region serving as an inspection region is irradiated with light, thereby emphasizing the inspection region without any influence of a pattern in a non-inspection region and detecting a printing failure accurately as compared to conventional inspection that irradiates a wide range with light.

EXPLANATION OF THE REFERENCE NUMERALS AND SIGNS

3 . . . web, 23 . . . lighting device, 43 . . . light source, 61 . . . irradiation port, 62 . . . first plate member, 62b . . . first parallel portion, 63 . . . second plate member, 63b . . . second parallel portion, 92, 112 . . . sheet

The invention claimed is:

1. A lighting device for a printing press comprising:
a light source; and
a light shielding member having an irradiation port which opens linearly,
wherein the light shielding member includes a first plate member and a second plate member,
the first plate member and the second plate member include a first parallel portion and a second parallel portion, respectively,
the first parallel portion and the second parallel portion parallelly face each other, and
the irradiation port is formed between the first parallel portion and the second parallel portion,
further comprising an air blast member for supplying cooling air to the light source, the irradiation port configured to irradiate light from the light source on one of a sheet and a web under conveyance and discharge the cooling air to outside of the lighting device.

2. The lighting device according to claim 1, wherein the first plate member and the second plate member further includes, respectively, each of which is configured to reflect some of the light from the light source,
a first reflecting portion and a second reflecting portion are inclined such that a space between the first plate member and the second plate member gradually becomes narrower from a side of the light source toward the irradiation port.

3. An inspection device configured to determine quality of a printed product, the inspection device comprising:
a lighting device according to claim 1, the lighting device configured to irradiate a color bar printed on one of a sheet and a web under conveyance with light,
a camera configured to capture the color bar which is irradiated with light of the lighting device;
an acquisition circuit configured to acquire a color measurement value of image data captured by the camera;
a calculator configured to calculate a density value of the color bar using the color measurement value acquired by the acquisition circuit; and
a determination circuit configured to determine quality by comparing the density value with a determination criterion,
wherein the lighting device irradiates the color bar with linear light.

4. The inspection device according to claim 3, wherein an opening width of the irradiation port in a direction orthogonal to the widthwise direction of one of the sheet and the web is narrower than a width of the color bar in the direction orthogonal to the widthwise direction of one of the sheet and the web.

5. The inspection device according to claim 3, further comprising:
- a detector configured to detect a type of one of the sheet and the web; and
- a storage device configured to store a correction value for each type of one of the sheet and the web;
- wherein the calculator is configured to read out, from the storage device, the correction value corresponding to the type of one of the sheet and the web detected by the type detection unit and calculate a density value of the color bar using the correction value and the color measurement value acquired by the acquisition circuit.

* * * * *